United States Patent
Xie et al.

(10) Patent No.: US 9,210,570 B2
(45) Date of Patent: Dec. 8, 2015

(54) SYSTEMS AND METHODS FOR IMPLEMENTING BLUETOOTH LOW ENERGY COMMUNICATIONS

(71) Applicant: BROADCOM CORPORATION, Irvine, CA (US)

(72) Inventors: Guoxin Xie, San Diego, CA (US); Angel Arturo Polo, Solana Beach, CA (US)

(73) Assignee: BROADCOM CORPORATION, Irvine, CA (US)

( * ) Notice: Subject to any disclaimer, the term of this patent is extended or adjusted under 35 U.S.C. 154(b) by 106 days.

(21) Appl. No.: 14/022,034

(22) Filed: Sep. 9, 2013

(65) Prior Publication Data

US 2015/0049871 A1 Feb. 19, 2015

Related U.S. Application Data

(60) Provisional application No. 61/866,436, filed on Aug. 15, 2013.

(51) Int. Cl.
| | |
|---|---|
| *H04L 29/06* | (2006.01) |
| *H04W 12/04* | (2009.01) |
| *H04W 12/08* | (2009.01) |
| *H04W 12/02* | (2009.01) |

(Continued)

(52) U.S. Cl.
CPC ........... *H04W 12/04* (2013.01); *H04L 63/0435* (2013.01); *H04L 63/0492* (2013.01); *H04W 12/02* (2013.01); *H04W 12/08* (2013.01); *H04L 67/125* (2013.01); *H04W 4/005* (2013.01); *H04W 4/008* (2013.01)

(58) Field of Classification Search
CPC ..... H04W 12/08; H04W 60/00; H04W 52/46; H04W 60/02; H04W 60/06; H04W 4/005; H04W 12/04; H04L 63/0435; H04L 63/0492
USPC .......................................................... 380/270
See application file for complete search history.

(56) References Cited

U.S. PATENT DOCUMENTS

| | | | | |
|---|---|---|---|---|
| 2006/0018319 A1* | 1/2006 | Palin et al. | .............. | A63F 13/12 370/390 |
| 2009/0232041 A1* | 9/2009 | Smith | ................... | H04L 1/1867 370/312 |

(Continued)

OTHER PUBLICATIONS

Bluetooth Special Interest Group (SIG), Specification of the Bluetooth System; Covered Core Package version 4.0, Jun. 30, 2010, vol. VI.*

(Continued)

*Primary Examiner* — Victor Lesniewski
(74) *Attorney, Agent, or Firm* — McDermott Will & Emery LLP

(57) ABSTRACT

Systems and methods for implementing Bluetooth Low Energy (BLE) communications are provided. In some aspects, a method includes receiving, by a first BLE device, a first advertisement packet from a second BLE device. The first advertisement packet includes a payload encrypted based on a predetermined key. The method also includes decrypting the payload of the first advertisement packet using the predetermined key. The method also includes processing, by the first BLE device, the decrypted payload. At least one of the receiving, the decrypting, or the processing is performed without a BLE connection being established between the first BLE device and the second BLE device.

20 Claims, 4 Drawing Sheets

(51) Int. Cl.
*H04L 29/08* (2006.01)
*H04W 4/00* (2009.01)

(56) References Cited

U.S. PATENT DOCUMENTS

| | | | |
|---|---|---|---|
| 2010/0120362 A1* | 5/2010 | Walley et al. | 455/41.2 |
| 2011/0021143 A1* | 1/2011 | Kapur et al. | 455/41.2 |
| 2011/0022916 A1* | 1/2011 | Desai et al. | 714/748 |
| 2011/0060669 A1* | 3/2011 | Laves | 705/34 |
| 2011/0319020 A1* | 12/2011 | Desai et al. | 455/41.2 |
| 2012/0196534 A1* | 8/2012 | Kasslin et al. | 455/41.2 |
| 2012/0257561 A1* | 10/2012 | Redding | H04L 12/1827 370/312 |
| 2012/0322466 A1* | 12/2012 | Das et al. | H04W 8/005 455/458 |
| 2013/0109323 A1* | 5/2013 | Ruutu et al. | 455/68 |
| 2013/0165044 A1* | 6/2013 | Xie et al. | H04W 52/0229 455/41.2 |
| 2013/0254104 A1* | 9/2013 | Fernandez | 705/40 |
| 2013/0259230 A1* | 10/2013 | Polo | H04L 63/0272 380/270 |
| 2013/0326495 A1* | 12/2013 | Reunamaki et al. | 717/173 |
| 2014/0055243 A1* | 2/2014 | Kerai | 340/10.1 |
| 2014/0357192 A1* | 12/2014 | Azogui et al. | 455/41.2 |
| 2014/0378057 A1* | 12/2014 | Ramon et al. | 455/41.2 |

OTHER PUBLICATIONS

Liu, Jia; Chen, Canfeng; Ma, Yan; "Modeling and Performance Analysis of Device Discovery in Bluetooth Low Energy Networks", IEEE Global Communications Conference, Dec. 3-7, 2012, pp. 1538-1543.*

* cited by examiner

SYSTEMS AND METHODS FOR IMPLEMENTING BLUETOOTH LOW ENERGY COMMUNICATIONS

CROSS-REFERENCES TO RELATED APPLICATIONS

The present application claims the benefit of U.S. Provisional Patent Application Ser. No. 61/866,436, titled "Systems and Methods for Implementing Bluetooth Low Energy Communications," filed on Aug. 15, 2013, which is hereby incorporated by reference in its entirety for all purposes.

FIELD

The subject technology generally relates to wireless communications and, in particular, for example, relates to systems and methods for implementing Bluetooth Low Energy communications.

BACKGROUND

Bluetooth Low Energy (BLE) is a wireless computer network technology having applications in the healthcare, fitness, security, and home entertainment industries, as well other industries. Compared to "classic" Bluetooth, BLE is intended to provide considerably reduced power consumption and lower cost while maintaining a similar communication range. In theory, BLE allows a given BLE device to establish many simultaneous connections with other BLE devices (e.g., more than 10). However, in practice, a large number of simultaneous connections may not necessarily be achievable due to limited system resources allocated in the given BLE device to establish those connections (e.g., resources for scheduling, handshaking, saving data to memory, etc.).

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

According to various aspects of the subject technology, systems and methods are provided for implementing BLE communications between BLE devices while minimizing the resources needed to establish BLE connections between the BLE devices. According to certain aspects, instead of establishing BLE connections between the BLE devices, the BLE devices can communicate with one another through the use of advertisement packets. Broadcasting an advertisement packet is a less resource intensive operation than establishing a BLE connection. Thus, when a BLE device broadcasts advertisement packets to other BLE devices, it may not need to allocate the same amount of resources required to establish BLE connections with the other BLE devices. In this regard, by encapsulating payload data within advertisement packets, a BLE device can communicate with a significantly larger number of other BLE devices without having to allocate the same amount of resources required to establish BLE connections with those devices. In some aspects, the payload data of the advertisement packets may be encrypted to provide security and prevent eavesdropping that can compromise communications content.

Figure 1:
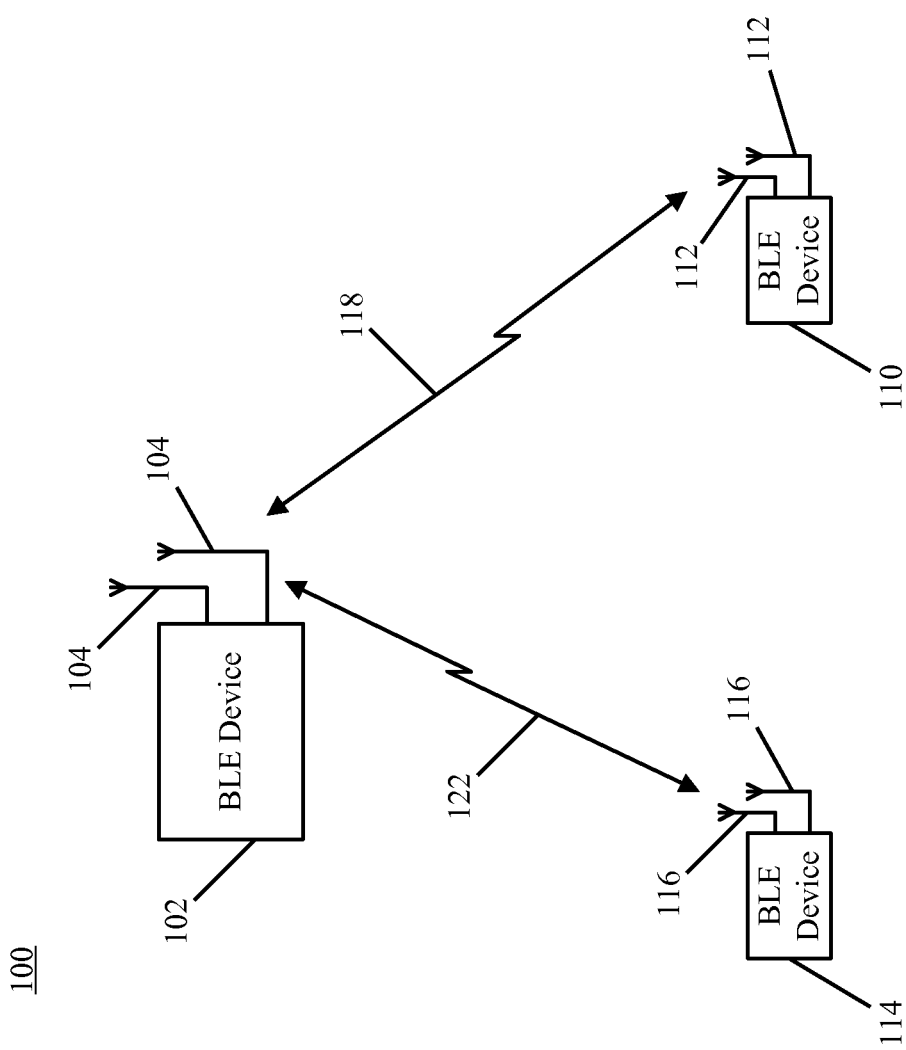
FIG. 1 illustrates an example of a BLE communication system, in accordance with various aspects of the subject technology.

FIG. 1 illustrates an example of BLE communication system 100, in accordance with various aspects of the subject technology. System 100 includes a first BLE device 102 communicating with a second BLE device 110 and a third BLE device 114. BLE devices 102, 110, and 114 may be any suitable device capable of engaging in BLE communications, such as, but not limited to, mobile phones, tablets, computers, personal digital assistants, video game devices, garage door openers, individual interior and exterior lighting, heat, ventilation, and air conditioning (HVAC) systems, home security systems, multimedia devices (e.g., televisions, set top boxes, receivers, etc.), pet tags, appliances (e.g., coffee makers, refrigerators, washing machines, etc.), windows, automatic shades, locks, fitness devices, medical devices, monitoring devices, and/or chips embedded within or otherwise coupled to these devices.

For example, first BLE device 102 may be a smartphone, while second BLE device 110 and third BLE device 114 may be light sources (or sensors embedded in the light sources). In such a situation, first BLE device 102 may communicate with second BLE device 110 and third BLE device 114 and provide instructions to turn on or off the light sources. In another example, first BLE device 102 may be any device with a display, while second BLE device 110 and third BLE device 114 may be health monitoring devices (or sensors embedded in the health monitoring devices). In this situation, second BLE device 110 and third BLE device 114 may provide information associated with a patient (e.g., heart rate, glucose levels, temperature, etc.) to first BLE device 102 so that this information can be displayed by first BLE device 102.

In one or more implementations, system 100 operates in accordance with the Bluetooth Low Energy standard (e.g., Bluetooth 4.0 specification), which is incorporated by reference herein. However, it is understood that system 100 may operate in accordance with any other suitable communication protocol. First BLE device 102 includes one or more antennas 104 for communicating with second BLE device 110 and third BLE device 114. Second BLE device 110 also includes one or more antennas 112, while third BLE device 114 includes one or more antennas 116. First BLE device 102 may establish BLE connection 118 with second BLE device 110, as well as simultaneously establish BLE connection 122 with third BLE device 114. Although the BLE standard theoretically allows first BLE device 102 to establish many simultaneous connections with other BLE devices (e.g., second BLE device 110 and third BLE device 114), a large number of simultaneous connections may not necessarily be achievable due to limited system resources allocated in first BLE device 102 to establish those connections (e.g., resources for scheduling, handshaking, saving data to memory, etc.).

As discussed above, BLE communications can be still be implemented between first BLE device 102 and BLE devices 110 and 114 even without BLE connections 118 and 122 being established. Instead of establishing BLE connections 118 and 122, first BLE device 102 can communicate with second BLE device 110 and third BLE device 114 through the use of advertisement packets. In one or more implementations, first BLE device 102 may encapsulate payload data within the advertisement packets, and broadcast these packets to second BLE device 110 and/or third BLE device 114 before or without BLE connections 118 and 122 being established. Thus, first BLE device 102 can communicate with any number of BLE devices without being limited by the number of simultaneous BLE connections it can support.

According to certain aspects, first BLE device 102 may encrypt the payloads of the advertisement packets in order to provide security and prevent eavesdropping. The payloads may be encrypted using a predetermined key that is known to BLE devices 102, 110, and 114. For example, first BLE device 102 and second BLE device 110 may be previously bonded with one another, and from that bonding, the predetermined key may have been exchanged or otherwise shared between them. Similarly, first BLE device 102 and third BLE device 114 may be previously bonded with one another, and from that bonding, the predetermined key may have been exchanged or otherwise shared between them. Thus, when first BLE device 102 broadcasts an advertisement packet comprising an encrypted payload, second BLE device 110 and/or third BLE device 114 can decrypt the payload even before or without BLE connections being established 118 and 122. By sharing the predetermined key with a large number of BLE devices, first BLE device 102 can communicate securely with those devices. For example, if first BLE device 102 is a smartphone, and second BLE device 110 and third BLE device 114 are light sources, first BLE device 102 can control these light sources to turn on or off in a secure manner.

Figure 2:
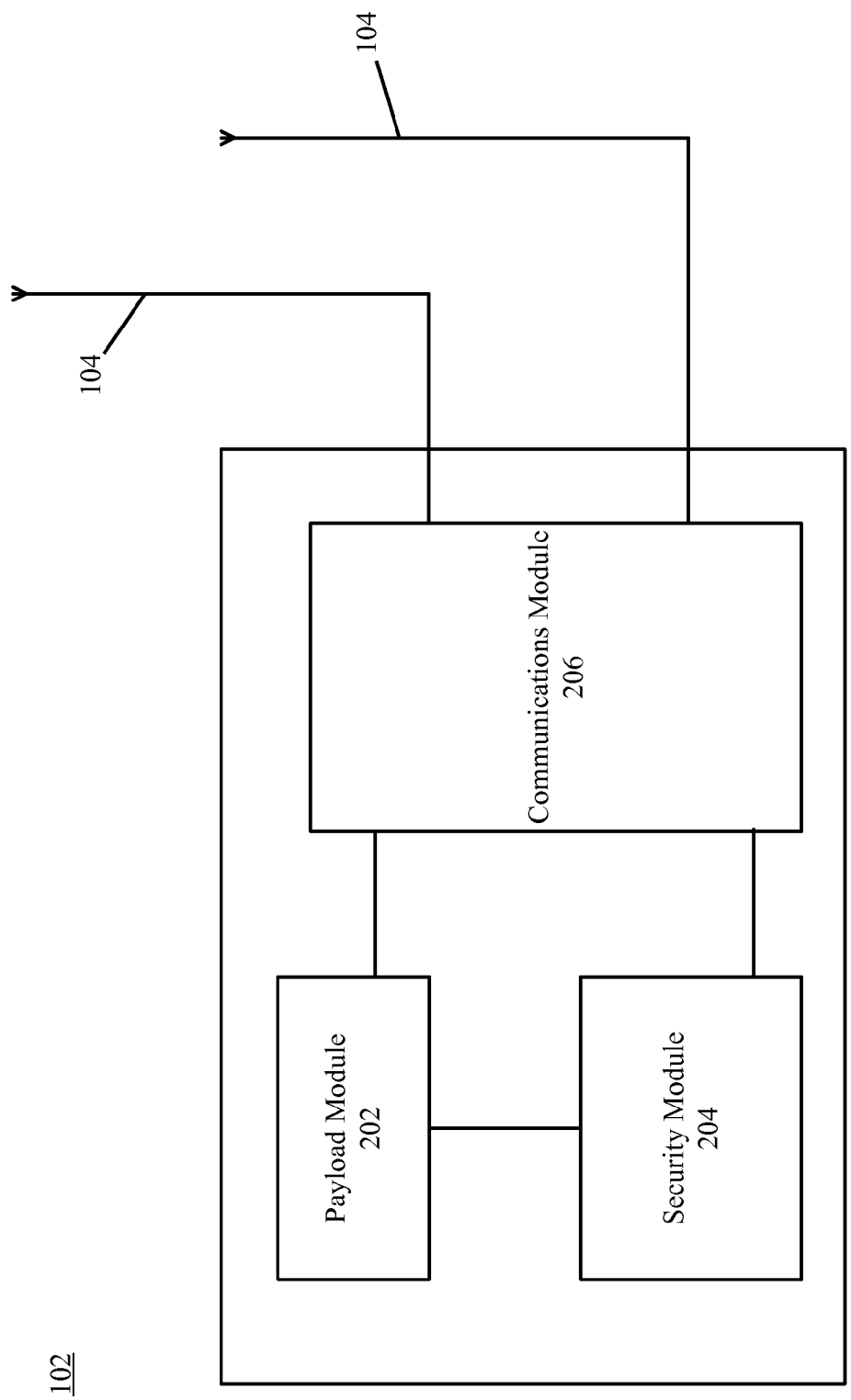
FIG. 2 is a block diagram that schematically illustrates a BLE device, in accordance with various aspects of the subject technology.

FIG. 2 is a block diagram that schematically illustrates first BLE device 102, in accordance with various aspects of the subject technology. First BLE device 102 includes payload module 202, security module 204 coupled to payload module 202, communications module 206 coupled to payload module 202 and security module 204, and one or more antennas 104 coupled to communications module 206. Communications module 206 may receive signals from and transmit signals to other devices (e.g., second BLE device 110 and third BLE device 114) via one or more antennas 104. According to certain aspects, the configuration of second BLE device 110 and third BLE device 114 may be the same or similar to the configuration of first BLE device 102 shown in FIG. 2.

According to certain aspects, the components of first BLE device 102 as shown in FIG. 2 may be implemented in software (e.g., subroutines and code). In some aspects, some or all of the components may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these components according to various aspects of the subject technology are further described in the present disclosure.

Figure 3:
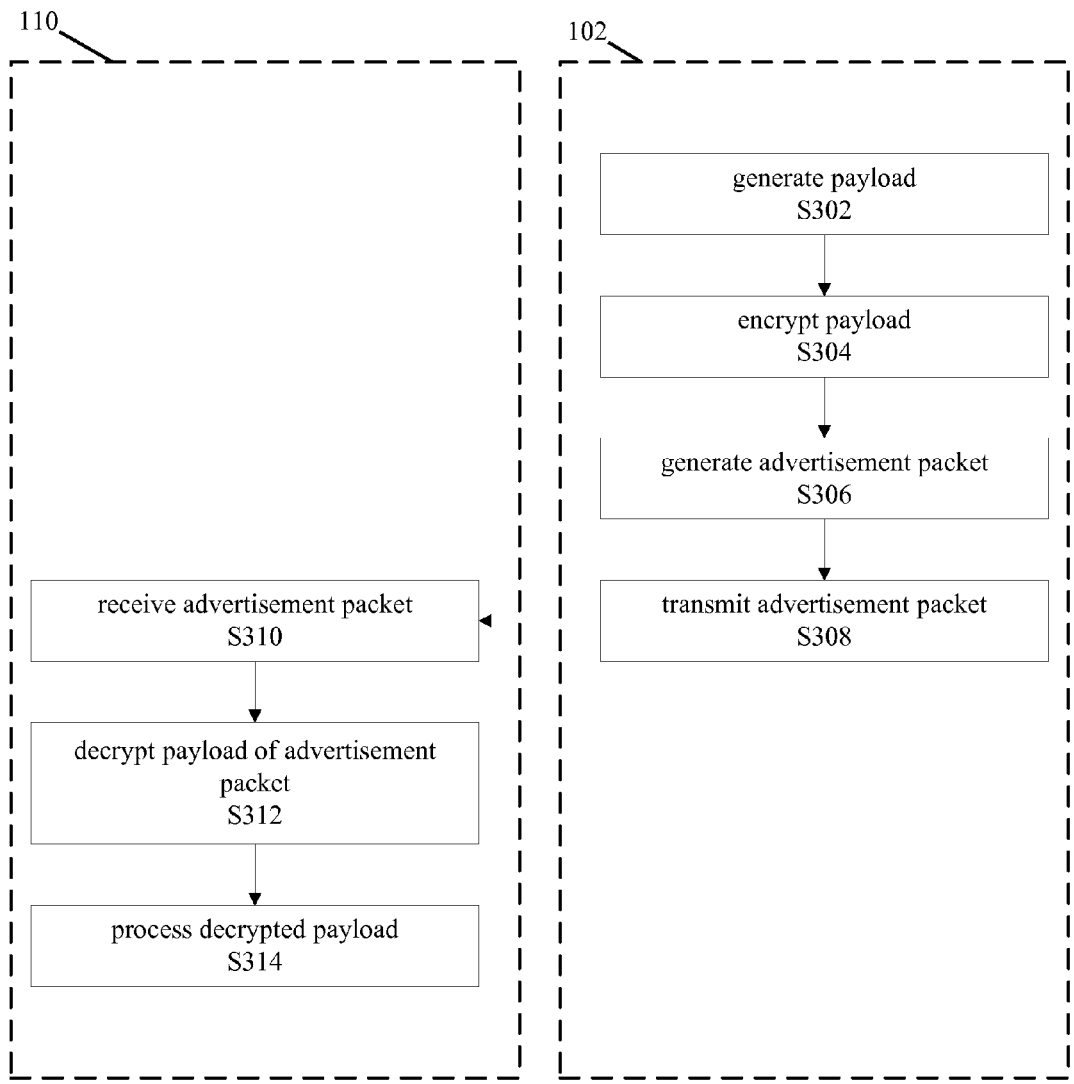
FIG. 3 illustrates an example of a method for implementing BLE communications, in accordance with various aspects of the subject technology.

FIG. 3 illustrates an example of method 300 for implementing BLE communications, in accordance with various aspects of the subject technology. Method 300 may be implemented by first BLE device 102 and/or second BLE device 110 when these devices are communicating with one another using advertisement packets. However, method 300 may also be implemented by communication devices having other configurations. Although method 300 is described herein with reference to the examples of FIGS. 1 and 2, method 300 is not limited to these examples. Furthermore, method 300 may be implemented in an order different from the one shown in FIG. 3.

Method 300 includes processes S302, S304, S306, S308, S310, S312, and S314. Processes S302, S304, S306, and S308 may be implemented by first BLE device 102, and therefore are shown in FIG. 3 as being within first BLE device 102. Processes S310, S312, and S314 may be implemented by second BLE device 110, and therefore are shown in FIG. 3 as being within second BLE device 110. Although the processes implemented by first BLE device 102 and second BLE device 110 are described as being part of method 300, the processes implemented by first BLE device 102 may, in certain aspects, be considered a separate method from the processes implemented by second BLE device 110.

According to process S302, payload module 202 of first BLE device 102 generates a payload. The payload may include any information to be communicated with second BLE device 110. For example, the payload may include instructions for second BLE device 110 to perform a certain action. According to process S304, security module 204 of first BLE device 102 encrypts the payload based on the predetermined key. For example, security module 204 encrypts the payload using the predetermined key that was previously shared between first BLE device 102 and second BLE device 110. According to process S306, payload module 202 generates an advertisement packet based on the encrypted payload. For example, the generated advertisement packet may include the encrypted payload.

According to process S308, communications module 206 of first BLE device 102 transmits the advertisement packet to second BLE device 110. According to process S310, the communications module of second BLE device 110 receives the advertisement packet. For example, second BLE device 110 may be in a scanning mode listening for any advertisement packets from first BLE device 102. According to process S312, once the advertisement packet is received, the security module of second BLE device 110 decrypts the payload of the advertisement packet using the predetermined key.

According to process S314, once the payload has been decrypted, the payload module of second BLE device 110 processes the payload. In one or more implementations, the payload module may interpret the payload and determine whether any action needs to be taken. For example, if the payload includes instructions for second BLE device 110 to perform an action, the payload module may initiate that action. Depending on what type of device that second BLE device 110 is (or coupled thereto) and what type of instructions are included in the decrypted payload, the action can include turning on or off an object (e.g., turning on or off a light source), adjusting a setting of the object (e.g., dimming the light source, turning down the volume of a television, changing the time of a clock, etc.), providing information associated with the object (e.g., reporting a temperature recorded by a monitoring device, reporting patient information recorded by a medical device, providing the time of the clock, etc.), opening or closing the object (e.g., opening or closing a door, window, cabinet, etc.), locking or unlocking the object (e.g., locking or unlocking the door, window, cabinet, etc.), and/or any other suitable action that can be performed by a BLE device.

Having received the payload, second BLE device 110 may transmit an acknowledgment and/or other information back to first BLE device 102. According to certain aspects, second BLE device 110 may communicate the acknowledgment and/or other information in the same or similar manner as first BLE device 110. For example, second BLE device 110 may encapsulate such information in another advertisement packet and broadcast the advertisement packet to first BLE device 102. Thus, a BLE connection between first BLE device 102 and second BLE device 110 does not even need to be established.

As discussed above, communicating via advertisement packets allows first BLE device 102 to communicate with many other BLE devices. Since first BLE device 102 broadcasts advertisement packets to many BLE devices instead of a specific BLE device, it may be cumbersome for first BLE device 102 to separately generate a payload for each receiving BLE device. Thus, according to various aspects of the subject technology, first BLE device 102 may generate a single payload for a plurality of other BLE devices. The payload may be generated in a format that would allow a receiving BLE device to determine whether any portion of the payload is intended for the receiving BLE device. For example, the payload may be generated such that each bit position of the payload may be associated with a particular BLE device (e.g., a first bit is for a first receiving BLE device, a second bit is for a second receiving BLE device, a third bit is for a third receiving BLE device, etc.). Thus, first BLE device 102 can broadcast a single payload in an advertisement packet to multiple receiving BLE devices while allowing each receiving BLE device to receive a portion of the payload specific to itself.

In this regard, when second BLE device 110 decrypts the payload of the advertisement packet received from first BLE device 102, the payload module of second BLE device 110 may process the payload by determining whether the decrypted payload is associated with second BLE device 110 or some other BLE device (e.g., third BLE device 114). If the payload module determines that the payload is not associated with second BLE device 110, then the payload module may ignore the payload.

Figure 4:
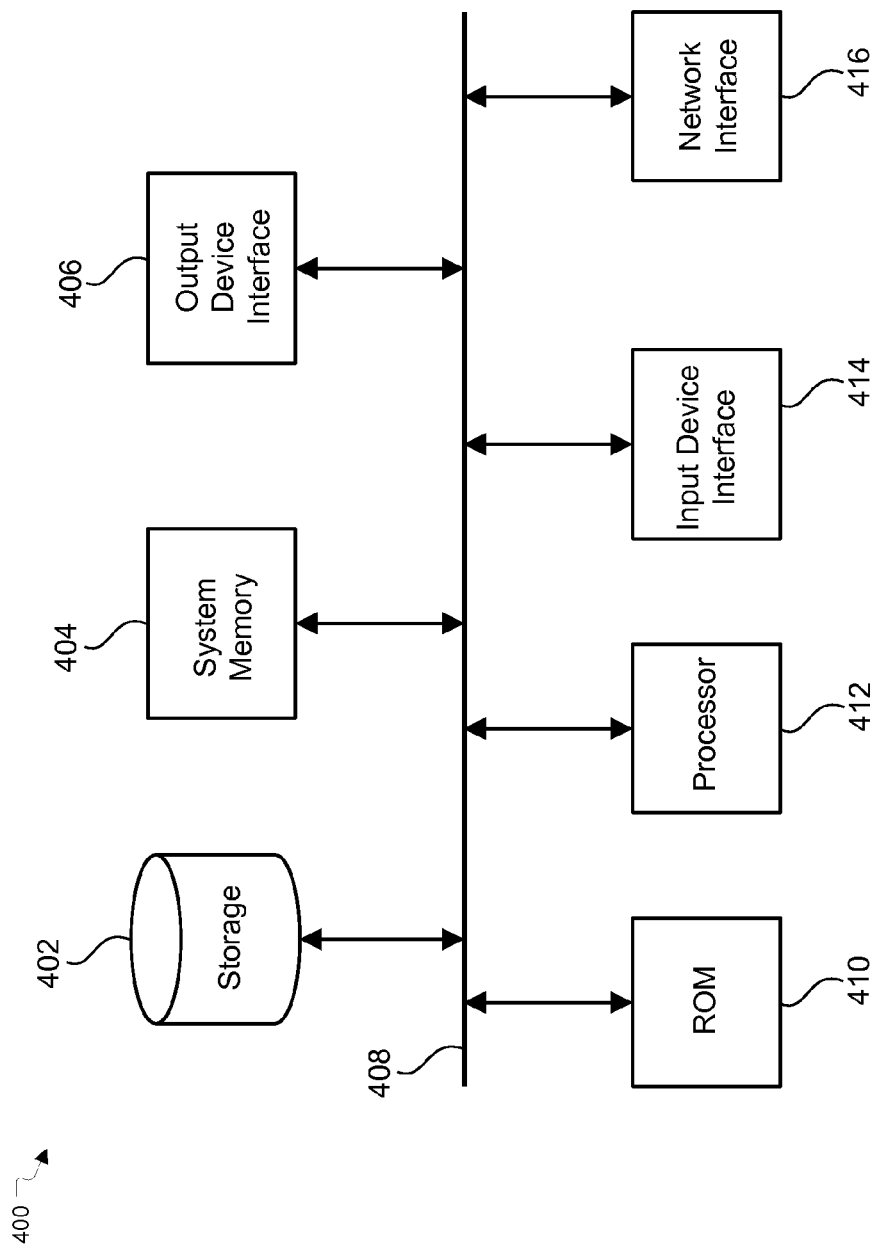
FIG. 4 conceptually illustrates an electronic system with which aspects of the subject technology may be implemented.

FIG. 4 conceptually illustrates electronic system 400 with which aspects of the subject technology may be implemented. Electronic system 400, for example, can be a desktop computer, a laptop computer, a tablet computer, a server, a phone, a personal digital assistant (PDA), a video game device, any device that implements BLE communications, or generally any electronic device that transmits signals over a network. Such an electronic system includes various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for implementing Bluetooth Low Energy (BLE) communications, the method comprising:
   receiving, by a first BLE device, a first advertisement packet broadcast to a plurality of BLE devices from a second BLE device, wherein the first advertisement packet comprises a payload encrypted based on a predetermined key, the payload having two or more portions respectively associated with different BLE devices of the plurality of BLE devices;
   decrypting the payload of the first advertisement packet using the predetermined key; and
   processing, by the first BLE device, one or more portions of the decrypted payload associated with the first BLE device,
   wherein at least one of the receiving, the decrypting, or the processing is performed without a BLE connection being established between the first BLE device and the second BLE device.

2. The method of claim 1, wherein the first advertisement packet is received by the first BLE device according to a BLE standard.

3. The method of claim 1, further comprising bonding the first BLE device with the second BLE device prior to the first advertisement packet being received by the first BLE device.

4. The method of claim 3, wherein bonding the first BLE device with the second BLE device comprises sharing the predetermined key between the first BLE device and the second BLE device.

5. The method of claim 1, wherein processing the decrypted payload comprises initiating an action based on the decrypted payload.

6. The method of claim 5, wherein the action comprises at least one of turning on an object, turning off the object, adjusting a setting of the object, providing information associated with the object, opening the object, closing the object, locking the object, or unlocking the object.

7. The method of claim 6, wherein the object comprises at least one of a light source, a door, a window, an air conditioning system, a temperature monitoring system, an appliance, a multimedia device, a fitness device, or a medical device.

8. The method of claim 1, further comprising:
   receiving, by a third BLE device, the first advertisement packet from the second BLE device;
   decrypting, by the third BLE device, the payload of the first advertisement packet using the predetermined key; and
   processing, by the third BLE device, the decrypted payload.

9. The method of claim 8, further comprising sharing the predetermined key between the first BLE device, the second BLE device, and the third BLE device.

10. The method of claim 8, wherein processing, by the first BLE device, the decrypted payload comprises determining whether the decrypted payload is associated with the first BLE device.

11. The method of claim 10, wherein processing, by the first BLE device, the decrypted payload comprises ignoring the decrypted payload if the decrypted payload is determined to not be associated with the first BLE device.

12. The method of claim 1, further comprising transmitting, by the first BLE device, a second advertisement packet to the second BLE device, wherein the second advertisement comprises an acknowledgment encrypted based on the predetermined key.

13. The method of claim 12, wherein the transmitting is performed without the BLE connection being established between the first BLE device and the second BLE device.

14. A method for implementing Bluetooth Low Energy (BLE) communications, the method comprising:
   encrypting a payload based on a predetermined key;
   generating a first advertisement packet based on the encrypted payload; and
   transmitting, by a first BLE device, the first advertisement packet in a broadcast to a plurality of BLE devices, the payload having two or more portions respectively associated with different BLE devices of the plurality of BLE devices,
   wherein at least one of the encrypting, the generating, or the transmitting is performed without a BLE connection being established between the first BLE device and a second BLE device of the plurality of BLE devices.

15. The method of claim 14, further comprising bonding the first BLE device with the second BLE device prior to the first advertisement packet being transmitted by the first BLE device.

16. The method of claim 15, wherein bonding the first BLE device with the second BLE device comprises sharing the predetermined key between the first BLE device and the second BLE device.

17. The method of claim 14, wherein the generated first advertisement packet comprises the encrypted payload.

18. A system for implementing Bluetooth Low Energy (BLE) communications, the system comprising:
   one or more processors; and
   a machine-readable medium comprising instructions stored therein, which when executed by the one or more processors, cause the one or more processors to perform operations comprising:
      receiving, by a first BLE device, a first advertisement packet broadcast to a plurality of BLE devices from a second BLE device according to a BLE standard, wherein the first advertisement packet comprises a payload encrypted based on a predetermined key, the payload having two or more portions respectively associated with different BLE devices of the plurality of BLE devices, and wherein the predetermined key is shared between the first BLE device and the second BLE device;
      decrypting the payload of the first advertisement packet using the predetermined key; and
      processing, by the first BLE device, one or more portions of the decrypted payload associated with the first BLE device,
      wherein at least one of the receiving, the decrypting, or the processing is configured to be performed without a BLE connection being established between the first BLE device and the second BLE device.

19. The system of claim 18, wherein at least one of the receiving, the decrypting, or the processing is performed before the BLE connection is established between the first BLE device and the second BLE device.

20. The system of claim 18, wherein the operations further comprise establishing the BLE connection between the first BLE device and the second BLE device.

* * * * *